(12) United States Patent
Kippie et al.

(10) Patent No.: US 7,565,933 B2
(45) Date of Patent: Jul. 28, 2009

(54) NON-AQUEOUS FOAM COMPOSITION FOR GAS LIFT INJECTION AND METHODS FOR MAKING AND USING SAME

(75) Inventors: David P. Kippie, Aliquippa, PA (US); Frank Zamora, Belpre, OH (US)

(73) Assignee: Clearwater International, LLC., Houston, TX (US)

( * ) Notice: Subject to any disclaimer, the term of this patent is extended or adjusted under 35 U.S.C. 154(b) by 89 days.

(21) Appl. No.: 11/736,971

(22) Filed: Apr. 18, 2007

(65) Prior Publication Data

US 2008/0257556 A1 Oct. 23, 2008

(51) Int. Cl.
*E21B 43/00* (2006.01)
(52) U.S. Cl. .................................. 166/372; 166/309
(58) Field of Classification Search ................. 166/372, 166/309
See application file for complete search history.

(56) References Cited

U.S. PATENT DOCUMENTS

| | | | |
|---|---|---|---|
| 2,196,042 A | 4/1940 | Timpson | 23/11 |
| 2,390,153 A | 12/1945 | Kern | 260/72 |
| 3,059,909 A | 10/1962 | Wise | 261/39.3 |
| 3,163,219 A | 12/1964 | Wyant et al. | 166/283 |
| 3,301,723 A | 1/1967 | Chrisp | 149/20 |
| 3,301,848 A | 1/1967 | Halleck | 536/123.1 |
| 3,303,896 A | 2/1967 | Tillotson et al. | 175/69 |
| 3,317,430 A | 5/1967 | Priestley et al. | 510/503 |
| 3,565,176 A | 2/1971 | Wittenwyler | 166/270 |
| 3,856,921 A | 12/1974 | Shrier et al. | 423/228 |
| 3,888,312 A | 6/1975 | Tiner et al. | 166/308.5 |
| 3,933,205 A | 1/1976 | Kiel | 166/308.1 |
| 3,937,283 A | 2/1976 | Blauer et al. | 166/307 |
| 3,960,736 A | 6/1976 | Free et al. | 507/216 |
| 3,965,982 A | 6/1976 | Medlin | 166/249 |
| 3,990,978 A | 11/1976 | Hill | 507/235 |
| 4,007,792 A | 2/1977 | Meister | 166/308.2 |
| 4,052,159 A | 10/1977 | Fuerst et al. | 8/539 |
| 4,067,389 A | 1/1978 | Savins | 166/246 |
| 4,108,782 A | 8/1978 | Thompson | 507/205 |
| 4,112,050 A | 9/1978 | Sartori et al. | 423/223 |
| 4,112,051 A | 9/1978 | Sartori et al. | 423/223 |
| 4,112,052 A | 9/1978 | Sartori et al. | 423/223 |
| 4,113,631 A | 9/1978 | Thompson | 507/202 |

(Continued)

FOREIGN PATENT DOCUMENTS

CA 2125513 1/1995

(Continued)

OTHER PUBLICATIONS

U.S. Appl. No. 12/075,461, filed Mar. 11, 2008, Gatlin et al.

(Continued)

*Primary Examiner*—William P Neuder
(74) *Attorney, Agent, or Firm*—Robert W. Strozier

(57) ABSTRACT

A hydrocarbon drilling fluid system is disclosed including a hydrocarbon fluid and a foaming composition, where the foaming composition includes a polymer, a gelling agent and its cross-linking agent, an optional foaming agent, or mixtures or combinations thereof. Uses of this drilling fluid system in a variety of downhole application are also disclosed.

28 Claims, 1 Drawing Sheet

Diesel Lightweight Fluid-Foamed Flow Loop Test

U.S. PATENT DOCUMENTS

| | | | |
|---|---|---|---|
| 4,378,845 A | 4/1983 | Medlin et al. | 166/297 |
| 4,461,716 A | 7/1984 | Barbarin et al. | 252/307 |
| 4,479,041 A | 10/1984 | Fenwick et al. | 200/81 R |
| 4,506,734 A | 3/1985 | Nolte | 166/308.1 |
| 4,514,309 A | 4/1985 | Wadhwa | 507/211 |
| 4,541,935 A | 9/1985 | Constien et al. | 507/225 |
| 4,549,608 A | 10/1985 | Stowe et al. | 166/280.1 |
| 4,561,985 A | 12/1985 | Glass, Jr. | 507/108 |
| 4,623,021 A | 11/1986 | Stowe | 166/250.1 |
| 4,654,266 A | 3/1987 | Kachnik | 428/403 |
| 4,657,081 A | 4/1987 | Hodge | 166/380.5 |
| 4,660,643 A | 4/1987 | Perkins | 166/283 |
| 4,683,068 A | 7/1987 | Kucera | 507/201 |
| 4,686,052 A | 8/1987 | Baranet et al. | 507/244 |
| 4,695,389 A | 9/1987 | Kubala | 507/244 |
| 4,705,113 A | 11/1987 | Perkins | 166/302 |
| 4,714,115 A | 12/1987 | Uhri | 166/308.1 |
| 4,718,490 A | 1/1988 | Uhri | 166/281 |
| 4,724,905 A | 2/1988 | Uhri | 166/250.1 |
| 4,725,372 A | 2/1988 | Teot et al. | 507/129 |
| 4,739,834 A | 4/1988 | Peiffer et al. | 166/308.4 |
| 4,741,401 A | 5/1988 | Walles et al. | 166/300 |
| 4,748,011 A | 5/1988 | Baize | 423/228 |
| 4,779,680 A | 10/1988 | Sydansk | 166/300 |
| 4,795,574 A | 1/1989 | Syrinek et al. | 507/238 |
| 4,817,717 A | 4/1989 | Jennings, Jr. et al. | 166/278 |
| 4,830,106 A | 5/1989 | Uhri | 166/250.1 |
| 4,846,277 A | 7/1989 | Khalil et al. | 166/280.1 |
| 4,848,468 A | 7/1989 | Hazlett et al. | 166/300 |
| 4,852,650 A | 8/1989 | Jennings, Jr. et al. | 166/250.1 |
| 4,869,322 A | 9/1989 | Vogt, Jr. et al. | 166/280.1 |
| 4,892,147 A | 1/1990 | Jennings, Jr. et al. | 166/280.2 |
| 4,926,940 A | 5/1990 | Stromswold | 166/247 |
| 4,938,286 A | 7/1990 | Jennings, Jr. | 166/280.1 |
| 4,978,512 A | 12/1990 | Dillon | 423/226 |
| 5,005,645 A | 4/1991 | Jennings, Jr. et al. | 166/280.1 |
| 5,024,276 A | 6/1991 | Borchardt | 166/308.6 |
| 5,067,556 A | 11/1991 | Fudono et al. | 62/196.4 |
| 5,074,359 A | 12/1991 | Schmidt | 166/280.1 |
| 5,074,991 A | 12/1991 | Weers | 208/236 |
| 5,082,579 A | 1/1992 | Dawson | 507/211 |
| 5,106,518 A | 4/1992 | Cooney et al. | 507/21 |
| 5,110,486 A | 5/1992 | Manalastas et al. | 507/260 |
| 5,169,411 A | 12/1992 | Weers | 44/421 |
| 5,224,546 A | 7/1993 | Smith et al. | 166/300 |
| 5,228,510 A | 7/1993 | Jennings, Jr. et al. | 166/263 |
| 5,246,073 A | 9/1993 | Sandiford et al. | 166/295 |
| 5,259,455 A | 11/1993 | Nimerick et al. | 166/308.5 |
| 5,330,005 A | 7/1994 | Card et al. | 166/280.2 |
| 5,342,530 A | 8/1994 | Aften et al. | 252/8.551 |
| 5,347,004 A | 9/1994 | Rivers et al. | 544/180 |
| 5,363,919 A | 11/1994 | Jennings, Jr. | 166/308.1 |
| 5,402,846 A | 4/1995 | Jennings, Jr. et al. | 166/259 |
| 5,411,091 A | 5/1995 | Jennings, Jr. | 166/280.1 |
| 5,424,284 A | 6/1995 | Patel et al. | 507/129 |
| 5,439,055 A | 8/1995 | Card et al. | 166/280.2 |
| 5,462,721 A | 10/1995 | Pounds et al. | 423/226 |
| 5,465,792 A | 11/1995 | Dawson et al. | 166/295 |
| 5,472,049 A | 12/1995 | Chaffee et al. | 166/250.1 |
| 5,482,116 A | 1/1996 | El-Rabaa et al. | 166/250.1 |
| 5,488,083 A | 1/1996 | Kinsey, III et al. | 507/211 |
| 5,497,831 A | 3/1996 | Hainey et al. | 166/308.1 |
| 5,501,275 A | 3/1996 | Card et al. | 166/280.2 |
| 5,551,516 A | 9/1996 | Norman et al. | 166/308.2 |
| 5,624,886 A | 4/1997 | Dawson et al. | 507/217 |
| 5,635,458 A | 6/1997 | Lee et al. | 507/240 |
| 5,649,596 A | 7/1997 | Jones et al. | 166/300 |
| 5,669,447 A | 9/1997 | Walker et al. | 166/300 |
| 5,674,377 A | 10/1997 | Sullivan, III et al. | 208/208 R |
| 5,688,478 A | 11/1997 | Pounds et al. | 423/228 |
| 5,693,837 A | 12/1997 | Smith et al. | 556/148 |
| 5,711,396 A | 1/1998 | Joerg et al. | 180/444 |
| 5,722,490 A | 3/1998 | Ebinger | 166/281 |
| 5,744,024 A | 4/1998 | Sullivan, III et al. | 208/236 |
| 5,755,286 A | 5/1998 | Ebinger | 166/281 |
| 5,775,425 A | 7/1998 | Weaver et al. | 166/276 |
| 5,787,986 A | 8/1998 | Weaver et al. | 166/280.2 |
| 5,806,597 A | 9/1998 | Tjon-Joe-Pin et al. | 166/300 |
| 5,807,812 A | 9/1998 | Smith et al. | 507/238 |
| 5,833,000 A | 11/1998 | Weaver et al. | 166/276 |
| 5,853,048 A | 12/1998 | Weaver et al. | 166/279 |
| 5,871,049 A | 2/1999 | Weaver et al. | 166/276 |
| 5,877,127 A | 3/1999 | Card et al. | 507/273 |
| 5,908,073 A | 6/1999 | Nguyen et al. | 166/276 |
| 5,908,814 A | 6/1999 | Patel et al. | 507/131 |
| 5,964,295 A | 10/1999 | Brown et al. | 166/308.2 |
| 5,979,557 A | 11/1999 | Card et al. | 166/300 |
| 5,980,845 A | 11/1999 | Cherry | 423/229 |
| 6,016,871 A | 1/2000 | Burts, Jr. | 166/300 |
| 6,035,936 A | 3/2000 | Whalen | 166/308.5 |
| 6,047,772 A | 4/2000 | Weaver et al. | 166/276 |
| 6,054,417 A | 4/2000 | Graham et al. | 507/238 |
| 6,059,034 A | 5/2000 | Rickards et al. | 166/280.2 |
| 6,060,436 A | 5/2000 | Snyder et al. | 507/266 |
| 6,069,118 A | 5/2000 | Hinkel et al. | 507/277 |
| 6,123,394 A | 9/2000 | Jeffrey | 299/16 |
| 6,133,205 A | 10/2000 | Jones | 507/276 |
| 6,147,034 A | 11/2000 | Jones et al. | 507/238 |
| 6,162,449 A | 12/2000 | Maier et al. | 424/401 |
| 6,162,766 A | 12/2000 | Muir et al. | 507/267 |
| 6,169,058 B1 | 1/2001 | Le et al. | 507/222 |
| 6,228,812 B1 | 5/2001 | Dawson et al. | 507/221 |
| 6,247,543 B1 | 6/2001 | Patel et al. | 175/64 |
| 6,267,938 B1 | 7/2001 | Warrender et al. | 423/226 |
| 6,283,212 B1 | 9/2001 | Hinkel et al. | 166/279 |
| 6,291,405 B1 | 9/2001 | Lee et al. | 507/136 |
| 6,330,916 B1 | 12/2001 | Rickards et al. | 166/280.2 |
| 6,725,931 B2 | 4/2004 | Nguyen et al. | 166/280.2 |
| 6,756,345 B2 | 6/2004 | Pakulski et al. | 507/246 |
| 6,793,018 B2 | 9/2004 | Dawson et al. | 166/300 |
| 6,832,650 B2 | 12/2004 | Nguyen et al. | 166/279 |
| 6,875,728 B2 | 4/2005 | Gupta et al. | 507/240 |
| 7,140,433 B2 | 11/2006 | Gatlin et al. | 166/250.01 |
| 7,268,100 B2 | 9/2007 | Kippie et al. | 507/244 |
| 7,350,579 B2 | 4/2008 | Gatlin et al. | 166/308.3 |
| 2002/0049256 A1 | 4/2002 | Bergeron, Jr. | 514/674 |
| 2002/0165308 A1 | 11/2002 | Kinniard et al. | 524/492 |
| 2003/0220204 A1 | 11/2003 | Baran, Jr. et al. | 507/200 |
| 2004/0177968 A1* | 9/2004 | Ramachandran | 166/372 |
| 2005/0045330 A1 | 3/2005 | Nguyen et al. | 166/281 |
| 2005/0092489 A1 | 5/2005 | Welton et al. | 166/280.2 |
| 2005/0137114 A1 | 6/2005 | Gatlin et al. | 510/424 |
| 2005/0153846 A1 | 7/2005 | Gatlin | 208/236 |
| 2005/0250666 A1 | 11/2005 | Gatlin et al. | 510/492 |
| 2006/0194700 A1 | 8/2006 | Gatlin et al. | 507/203 |
| 2007/0032693 A1 | 2/2007 | Gatlin et al. | 507/239 |
| 2007/0129257 A1 | 6/2007 | Kippie et al. | 507/102 |
| 2007/0131425 A1 | 6/2007 | Gatlin et al. | 166/280.2 |
| 2007/0173413 A1 | 7/2007 | Lukocs et al. | 507/238 |
| 2007/0173414 A1 | 7/2007 | Wilson, Jr. | 507/131 |
| 2008/0039345 A1 | 2/2008 | Kippie et al. | 507/213 |
| 2008/0257554 A1* | 10/2008 | Zamora et al. | 166/309 |

FOREIGN PATENT DOCUMENTS

| | | |
|---|---|---|
| CA | 2007965 | 2/1996 |
| DE | 4027300 | 5/1992 |
| EP | 0730018 A1 | 9/1996 |
| GB | 775376 | 10/1954 |
| JP | 10001461 | 6/1988 |
| JP | 08151422 | 11/1996 |
| WO | WO 98/19774 | 5/1998 |

| WO | WO 98/56497 | 12/1998 |

OTHER PUBLICATIONS

U.S. Appl. No. 11/554,834, filed Oct. 31, 2006, Venditto et al.
U.S. Appl. No. 11/765,306, filed Jun. 19, 2007, Kakadjian et al.
U.S. Appl. No. 11/748,248, filed May 14, 2007, Thompson et al.
U.S. Appl. No. 11/736,971, filed Apr. 18, 2007, Kippie et al.
U.S. Appl. No. 11/767,384, filed Jun. 22, 2007, Sweeney et al.
U.S. Appl. No. 11/741,110, filed Apr. 27, 2007, Wilson, Jr. et al.
U.S. Appl. No. 11/677,434, filed Feb. 21, 2007, Wanner et al.
U.S. Appl. No. 11/736,992, filed Apr. 18, 2007, Zamora et al.
U.S. Appl. No. 11/760,581, filed Jun. 8, 2007, Schwartz.
U.S. Appl. No. 12/029,335, filed Feb. 11, 2008, Kakadjian et al.
Sartori, F. and Savage, D.W., Sterically Hindered Amines for CO2 Removal from Gases, Ind. Eng. Chem. Fundam. 1983, 22, 239-249.

Fushslueger, U., Socher, G., Grether, H-J., Grasserbauer, M., Capillary Supercritical Fluid Chromatography/Mass Spectroscopy of Phenolic Mannich Bases with Dimethyl Ether Modified Ethane as Mobile Phase, Anal. Chem., 1999, 71, 2324-2333.

Delepine, M., Effect of Hydrogen Sulfide on Trimethyltrimethyl Triamine, Bull. Soc. Chim., 1896, 14, 889-891 (English Translation).

Delepine, M., Effect of Hydrogen Sulfide and Trimethyltrimethyl Triamine, Ann. Chim. Phys., 1896, 4, 114-133 (English Translation).

Paquin, A.M., Reaction of Primary Amines with Aliphatic Aldehydes, Chem. Ber., 1949, 82, 316-326 (English Translation).

Castillo, M., Avila, Y.S., Rodrigues, R.E., Viloria, A., H2S Liquid Scavengers, Their Corrosivity Properites and the Compatibility with Other Down Stream Processes, Corrosion 2000, paper 00491.

\* cited by examiner

NON-AQUEOUS FOAM COMPOSITION FOR GAS LIFT INJECTION AND METHODS FOR MAKING AND USING SAME

BACKGROUND OF THE INVENTION

1. Field of the Invention

The present invention relates to a gas lift system including a lift gas and a gas retention composition, where the composition improves gas lifting properties of the system and to methods for making and using same.

More particularly, the present invention relates to a gas lift system including a lift gas and a gas retention composition including a hydrocarbon base fluid, a viscosifying agent and optionally a foaming agent. The system is designed to be injected with or into a lift gas stream being pumped down hole and the resulting mixture of production fluids, gas lift and gas retention composition reduces a column weight increasing the amount of production fluids being transported to the surface. The injection can be at the surface or at any point down hole. The invention also relates to methods for making and using the systems of this invention.

2. Description of the Related Art

To obtain hydrocarbon fluids from a hydrocarbon bearing formation, a wellbore is drilled into the earth to intersect an area of interest within the formation. The wellbore may then be "completed" by inserting casing into the wellbore. Generally, after casing the wellbore, the casing is cemented into place by pumping cement between an outer surface of the casing and the wellbore. Alternatively, the wellbore can remain uncased, a so called "open hole wellbore", or the wellbore can be partially cased and cemented. Regardless of the form of wellbore completion, production tubing is typically run into the wellbore primarily to convey production fluids (e.g., hydrocarbon fluids, water, etc.) from the area of interest within the wellbore to the surface.

Often, pressure within the wellbore is insufficient to cause the production fluids to naturally rise through the production tubing to the surface, requiring artificial lift techniques, especially when the production fluid include heavy crude oil. One such artificial lift technique is a sucker rod lifting system. A sucker rod lifting systems generally includes a surface drive mechanism, a sucker rod string, and a downhole positive displacement pump. Production fluids are brought to the surface by the pumping action of the downhole pump powered by the drive mechanism attached to pump via the sucker rod string.

Another artificial lift technique is a gas lift system. In a typical gas lift system, a compressed gas is injected into an annulus between an outer surface of a production tubing and an inner surface of a casing. A valve system controls the supply of the injection gas to the wellbore and allows production fluids to exit the gas lift system at the top of the well.

The production tubing typically has gas lift mandrels having gas lift valves distributed along the length the production tubing in a spaced apart configuration. The gas lift valves allow or disallow gas to flow from the annulus into the production tubing via the mandrels to control the amount and position of gas being injected into the production tubing. A production packer located at a lower end of the production tubing forces the flow of production fluids from a reservoir or zone of interest in a producing formation up through the production tubing (into its interior) instead of up through the annulus and reduces or prevents injected gas from entering the formation.

In operation, production fluids flow from the formation into the wellbore through perforations extending through the casing into the formation. Once in the wellbore, the production fluid flow into an interior of the production tubing and are conveyed to the surface. When it is desired to lift the production fluids with a gas, a compressed gas is introduced into the annulus at a controlled rate. Any of the gas lift valves which are in their opened position will allow the gas to flow into the production tubing through an opening in the gas lift mandrel to lift the production fluids to the surface, by reducing the weight of the fluid due to the injected gas. The injected gas lowers the hydrostatic pressure in the production tubing to re-establish the required pressure differential between the reservoir and the wellbore, thereby causing the production fluids to flow to the surface.

Gas lift systems are often the preferred artificial lifting systems because they have fewer moving parts than other lifting systems. Moreover, gas lift systems are useful in many well where alternatives cannot be used.

Although gas lift systems are advantageous in most applications, wells which contain heavier production fluids (such as production fluid including heavier crude oil) are often not effectively served using typical gas lift systems. When heaver crude oil is present in the production fluids, the injected gas tends to channel up the production tubing. This gas channeling causes a stratified flow up the production tubing reducing the amount of production fluids being lifted to the surface and decreasing overall well production.

Thus, there is a need in the art for a gas lift system capable of effectively lifting production fluid, especially productions fluids that include heavy crude oil, from a producing formation to a surface and capable of reducing stratification of the production fluids in the production tubing, regardless of the makeup of the production fluids.

SUMMARY OF THE INVENTION

Embodiments of the present invention provide methods of producing a well or production fluids from a well, where the production fluids including hydrocarbons, water and other components, by injecting a lifting composition into a producing well or a well in the process of being placed on production to permit or increase production of well production fluids. The lifting composition includes a gas and a gas retention composition. The gas retention composition includes a hydrocarbon base fluid, a viscosifying agent and optionally a foaming agent.

The present invention also provides a method including the step of producing well or production fluids via a tubular member inserted into a wellbore, where the member is adapted to transport the well or production fluids to a surface by introducing a lifting composition into the member at one or a plurality of locations along the length of the member. The lifting composition includes a gas and a hydrocarbon-based gas retention composition. The gas retention composition includes a hydrocarbon base fluid, a viscosifying agent and optionally a foaming agent. When the lifting composition contacts the well or production fluids in the wellbore and/or the member, the lifting composition mixes with the well fluids resulting in the formation of lighted well fluids due to the inclusion and retention of the lift gas in the production fluids, generally the gas is retained in stable gas bubbles in the well or production fluids. The gas bubbles are adapted to reduce a hydrostatic pressure of the well fluids within the member and increasing a flow of well fluids to the surface. The stable gas bubbles form due to the interaction of the gas, the retention composition, and well or production fluids to form lighter weight well or production fluids that include stable bubbles, i.e., the gas, retention composition, production fluids mixture has a lower density than the production fluids alone, which reduces a column weight in the member permitting production or enhanced production.

In certain embodiments, the lifting composition can be introduced into the member through entry ports or points along its length in a spaced apart configuration. The method can also include the step of controlling the amount of injected lifting composition and/or location of injected lifting composition to optimize lift activity.

In other embodiments, the lifting composition is introduced into the well fluids and is mixed with the well fluids. The mixing results in stable bubble formation in the well fluids reducing a hydrostatic pressure inside the tubular member allowing the well fluids to flow to the surface. The method can also include the step of introducing the lifting composition into tubular member at one or more entry points or ports distributed along the length of the tubular member. The method can also include the step of controlling the amount and/or position of the injection to optimize or maximize the production of well fluids.

In another embodiments, the lifting composition is introduced into the tubular member using a mixing device. The mixing device is adapted to reduce a bubble size of bubbles formed in the well fluids due to the interaction between the well fluids and the lifting composition. The retention composition is adapted to improve gas dispersion and retention in the production fluids and to stabilize the bubbles formed in the well fluids.

In other embodiments, the lifting composition comprises one or more additives reducing bubble size, while in still other embodiments, the lifting composition comprises one or more additives for emulsifying the lifting composition.

In another embodiment, the present invention provides a method of producing hydrocarbon including the step of flowing well fluids including hydrocarbons through a tubular member for transport to a surface. As the well fluids enter the member, the method also includes the step of introducing a lifting composition into the tubular member in an amount sufficient to permit, increase and/or enhance well fluids transport to the surface. The lifting composition includes a gas and a hydrocarbon-based gas retention composition. The gas retention composition includes a hydrocarbon base fluid, a viscosifying agent and optionally a foaming agent. The introduction of the lifting composition in the well fluids resulting in the retention of gas in the well fluids and/or the generation of stable bubbles in the well fluids increasing a pressure differential between an exterior of the tubular member and an interior of the tubular member allowing the well fluids to move toward the surface permitting, increasing or enhancing well fluids production.

In certain embodiments, the method also includes the step of increasing a concentration of the lifting composition adjacent a wall of the tubular member to reduce wall drag, while in other embodiments, the lifting composition is introduced into the production tubing using a mixing apparatus such as a venturi nozzle or a vortex nozzle. In yet other embodiments, the lifting composition is introduced into the production tubing using a mixing apparatus such as a atomizer or a nebulizer.

The present invention also provides a method embodiments for forming a gasified, gas retention composition of this invention including the step of mixing a gas retention composition and an effective amount gas to form a gasified, gas retention composition, where the gas retention composition includes a hydrocarbon base fluid, a viscosifying agent and optionally a foaming agent. The viscosifying agent includes a polymer, a cross-linkable composition or mixtures or combinations thereof. The cross-linkable composition includes a gelling agent and a low concentration of a cross-linking agent. The gas can be selected from the group of air, nitrogen, membrane nitrogen, other nitrogen/oxygen gas mixtures, carbon dioxide, an inert gas, methane, ethane, propane, butane, mixtures of methane, ethane, propane and butane, natural gas, exhaust gas, flue gas or other similar gases or mixtures or combinations thereof. The gasified, gas retention composition is then injected into production fluids, in the presence or absence of a lift gas, in an amount and at locations sufficient to increase the transport of production fluids to the surface.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

Figure 1:
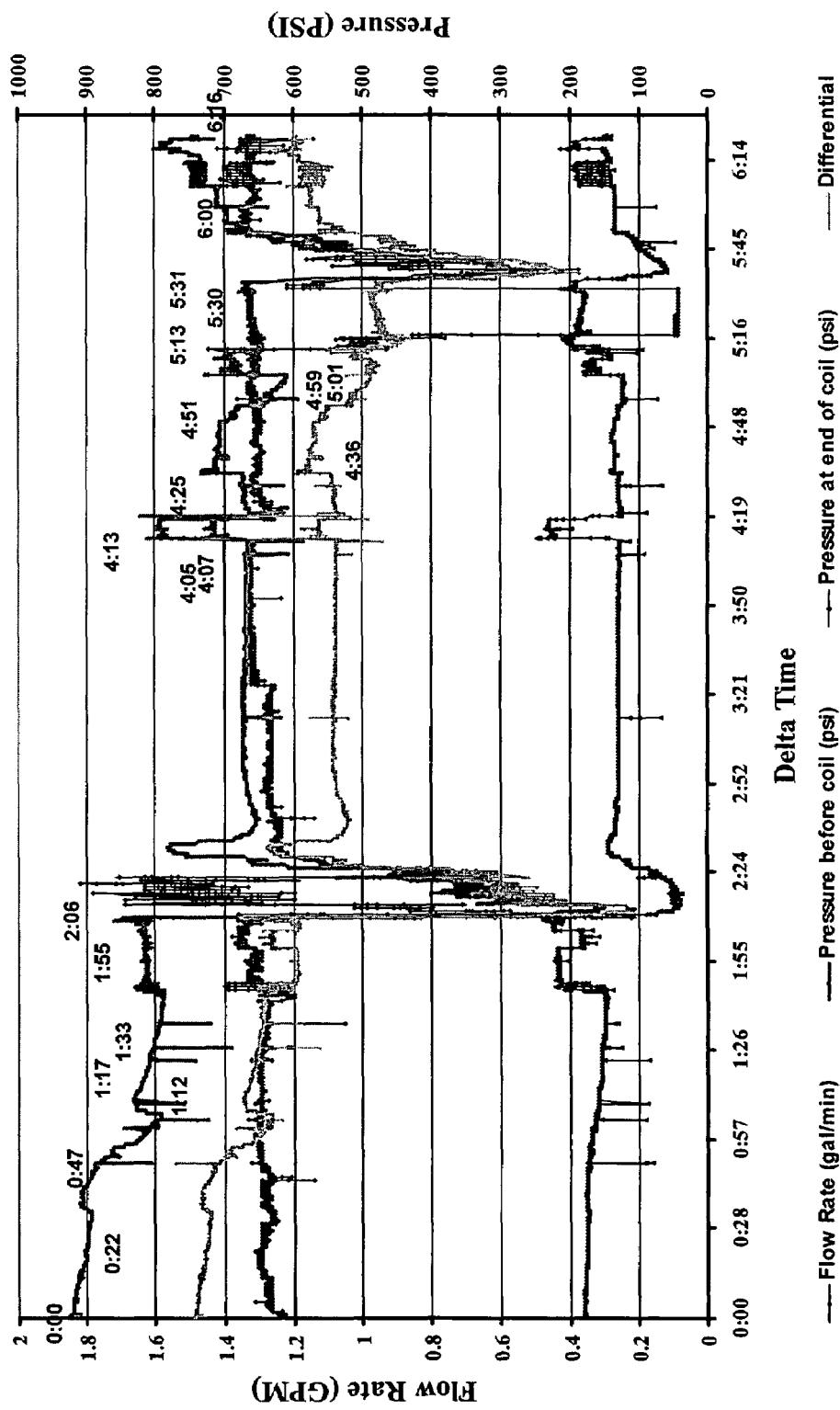
FIG. 1 depicts data from a flow loop test of a fluid of this invention to demonstrate its pumpability and foamability.

The inventors have found that an improved gas lift system can be designed so that a lift gas is injected into a well along with a gas retention composition of this invention including a hydrocarbon base fluid, a polymer, a gelling agent, and/or a cross-linking agent, and mixtures or combinations thereof. The inventors also have found that a gasified gas retention composition can be prepared by adding a gas such as air, nitrogen, membrane nitrogen, other nitrogen/oxygen gas mixtures, carbon dioxide, an inert gas, methane, natural gas, production gas (gas produced in an oil well along with the oil), exhaust gas, flue gas or other similar gas or mixtures thereof to the gasified gas retention composition. These compositions are designed to be introduced into a producing well or a well to be place on production to reduce a weight (density) of the production fluids so that the rate of production of the well can be increased. The compositions are designed to reduce a density of the well fluids. It is believed that the lift composition reduces the density of the well fluids by forming bubbles in the well fluids, where the hydrocarbon-based gas retention composition stabilizes the bubbles. The inventors have also found that the gas retention compositions of this invention are especially well suited for increasing well fluids production for well fluids that include heavy crude oil. The compositions of this invention are designed to decrease gas channeling and fluid stratification in the production tubing. The channeling and stratification results in gas flowing to the surface without assisting in the production of well fluids including heavy crude oil.

The present invention broadly relates to a lift composition including a gas and an effective amount of a gas retention composition including a hydrocarbon base fluid, a polymer, and/or a cross-linkable composition, and an optionally a foaming agent. The cross-linkable composition includes a gelling agent and a cross-linking, where the cross-linking agent is present in a concentration sufficient to produce a desired viscosity in gas retention composition by cross-linking the gelling agent. The gas retention composition can also be gasified to form a gasified retention composition, where the gas in the fluid improves dispersion of the gas retention composition in the well fluids and the retention of lift gas in the well fluids/gas retention composition. The gas retention compositions of this invention and a lift gas are adapted to be introduced into a wellbore and/or production tubing or a tubular production member to increase production of well fluids. The gasified gas retention compositions of this invention in the absence or presence of a lift gas are adapted to be introduced into a wellbore and/or production tubing or a tubular production member to increase production of well fluids. The introduction can be at the bottom of the production tubing or at one location or a plurality of locations along a length of the member to optimize or maximize the production of well fluids. The effective amount of the lift composition is sufficient to convert the well fluids into a lighter weight fluid having a weight between about 0.90 and about 0.1 of the weight of the well fluids in the absence of the lift composition through the introduction of stable bubbles in the well fluids.

The present invention broadly relates to a method for producing well fluids including the step of injecting an effective amount of a lift composition into a wellbore and/or a production tubing, where the amount is sufficient to permit and/or increase production of well fluids. The lift composition includes a gas and an effective amount of a gas retention composition, an effective amount of a gasified gas retention composition and/or a gas and an effective amount of a gasified gas retention composition. Upon injection, with or without mechanical mixing, the lift compositions are adapted to decrease a density of the well fluids, while decreasing gas channeling and increasing the production of well fluids. The inventors believe that the gas retention composition upon mixing with the well fluids imparts to the well fluids a greater capacity to form and retain gas bubbles in the well fluids. The production of stable bubbles in the well fluids is in an amount sufficient to form lightened well fluids or well fluids with reduced weight (reduced density or specific gravity). The lightened well fluids are adapted to increase the production of well fluids from the well through the production tubing or tubular member.

Unlike traditional gas lift compositions, the compositions of this invention are designed to increase the capacity of the well fluids to absorb, retain and/or entrain gas and/or to increase the formation and retention of stable bubbles in well fluids, especially in well fluids including heavy crude oil. The gas lift composition of this invention includes a lift gas and an effective amount of a gas retention composition. When the gas lift composition is mixed with the well fluids, the resulting light weight well fluids composition has reduced gas channeling properties and improved lift properties so that a rate of production of well fluids is increased relative to using a gas to lift the well fluid only. The lift compositions of this invention can be injected directly (gas and gas retention composition together) or the gas and the gas retention composition can be injected separately or the gas and gas retention composition can be injected partially together and partially separately. In certain embodiments, the gas is used to atomized the gas retention composition into the well fluids. In other embodiments, the gas retention composition is injected into the well fluids at the bottom of the production tubing, while the lift gas with or without additional gas retention composition is injected into the production fluids downstream of the gas retention composition injection, i.e., generally at one or more points or ports along a length of the production tubing. In other embodiments, the gas and a gasified lift composition are co-injected or separately injected into the well fluids. In other embodiments, a gasified lift composition is injected into the well fluid prior to the injection of a second amount of lift gas so that the gas retention composition is already dispersed in the well fluid before gas injection.

The lift compositions of this invention are designed to increase a capacity of the well fluids to absorb, retain, entrain or solubilize a lift gas within the well fluids. The lift composition is designed to be injection into the well fluids at any point along the production tubing or just before the production tubing. The amount of solubilized and retained gas is of course depend on various facts such as the gas used, the contact time, the contact pressure, the contact volume and/or the contract temperature, with volume, temperature and pressure related as is well known in scientific community. The gas absorption, solubilization and/or retention processes increase an energy of well fluids as the well fluids now include the gas retention composition and the dissolved gas. If the gas retention composition is pre-gasified, then at the point of a pressure reduction with or without shear such as when the gasified gas retention composition exits an injector nozzle, the gas in the gasified retention composition is released forming gas bubbles in the well fluids resulting in the formation of a lightened well fluids composition. The viscosifying agents in the gas retention composition further enhance the ability of the resulting well fluids composition to absorb, entrain, retain and carry heavy crude oil. The viscosifying agents also increase the ability for the fluid to absorb and retain a gas, i.e., improves the gas capturing ability of the fluid, and improves bubble stability in the well fluids.

Suitable Lift Composition Components

Suitable lift or gasifying gases for use in this invention include, without limitation, air, nitrogen, membrane nitrogen, other nitrogen/oxygen gas mixtures, carbon dioxide, an inert gas, methane, ethane, propane, butane, mixtures of methane, ethane, propane and butane, natural gas, exhaust gas, flue gas or other similar gases or mixtures or combinations thereof. Exemplary examples of inert gases including, without limitation, helium, neon, argon, xenon, krypton, or mixture or combinations thereof.

Suitable hydrocarbon base fluids for use in this invention includes, without limitation, synthetic hydrocarbon fluids, petroleum based hydrocarbon fluids, natural hydrocarbon (non-aqueous) fluids or other similar hydrocarbons or mixtures or combinations thereof. The hydrocarbon fluids for use in the present invention have viscosities ranging from about $5 \times 10^{-6}$ to about $600 \times 10^{-6}$ m$^2$/s (5 to about 600 centistokes). Exemplary examples of such hydrocarbon fluids include, without limitation, polyalphaolefins, polybutenes, polyolesters, biodiesels, simple low molecular weight fatty esters of vegetable or vegetable oil fractions, simple esters of alcohols such as Exxate from Exxon Chemicals, vegetable oils, animal oils or esters, other essential oil, diesel having a low or high sulfur content, kerosene, jet-fuel, white oils, mineral oils, mineral seal oils, hydrogenated oil such as PetroCanada HT-40N or IA-35 or similar oils produced by Shell Oil Company, internal olefins (IO) having between about 12 and 20 carbon atoms, linear alpha olefins having between about 14 and 20 carbon atoms, polyalpha olefins having between about 12 and about 20 carbon atoms, isomerized alpha olefins (IAO) having between about 12 and about 20 carbon atoms, VM&P Naptha, Linpar, Parafins having between 13 and about 16 carbon atoms, and mixtures or combinations thereof.

Suitable polyalphaolefins (PAOs) include, without limitation, polyethylenes, polypropylenes, polybutenes, polypentenes, polyhexenes, polyheptenes, higher PAOs, copolymers thereof, and mixtures thereof. Exemplary examples of PAOs include PAOs sold by Mobil Chemical Company as SHF fluids and PAOs sold formerly by Ethyl Corporation under the name ETHYLFLO and currently by Albemarle Corporation under the trade name Durasyn. Such fluids include those specified as ETYHLFLO 162, 164, 166, 168, 170, 174, and 180. Well suited PAOs for use in this invention include bends of about 56% of ETHYLFLO now Durasyn 174 and about 44% of ETHYLFLO now Durasyn 168.

Exemplary examples of polybutenes include, without limitation, those sold by Amoco Chemical Company and Exxon Chemical Company under the trade names INDOPOL and PARAPOL, respectively. Well suited polybutenes for use in this invention include Amoco's INDOPOL 100.

Exemplary examples of polyolester include, without limitation, neopentyl glycols, trimethylolpropanes, pentaerythriols, dipentaerythritols, and diesters such as dioctylsebacate (DOS), diactylazelate (DOZ), and dioctyladipate.

Exemplary examples of petroleum based fluids include, without limitation, white mineral oils, paraffinic oils, and medium-viscosity-index (MVI) naphthenic oils having viscosities ranging from about $5 \times 10^{-6}$ to about $600 \times 10^{-6}$ m$^2$/s (5 to about 600 centistokes) at 40° C. Exemplary examples of white mineral oils include those sold by Witco Corporation, Arco Chemical Company, PSI, and Penreco. Exemplary examples of paraffinic oils include solvent neutral oils available from Exxon Chemical Company, high-viscosity-index (HVI) neutral oils available from Shell Chemical Company, and solvent treated neutral oils available from Arco Chemical Company. Exemplary examples of MVI naphthenic oils include solvent extracted coastal pale oils available from Exxon Chemical Company, MVI extracted/acid treated oils available from Shell Chemical Company, and naphthenic oils sold under the names HydroCal and Calsol by Calumet and hydrogenated oils such as HT-40N and IA-35 from Petro-Canada or Shell Oil Company or other similar hydrogenated oils.

Exemplary examples of vegetable oils include, without limitation, castor oils, corn oil, olive oil, sunflower oil, sesame oil, peanut oil, palm oil, palm kernel oil, coconut oil, butter fat, canola oil, rape seed oil, flax seed oil, cottonseed oil, linseed oil, other vegetable oils, modified vegetable oils such as crosslinked castor oils and the like, and mixtures thereof. Exemplary examples of animal oils include, without limitation, tallow, mink oil, lard, other animal oils, and mixtures thereof. Other essential oils will work as well. Of course, mixtures of all the above identified oils can be used as well.

Suitable foaming agents for use in this invention include, without limitation, any foaming agent suitable for foaming hydrocarbon based fluids and/or mixed fluids (fluid including hydrocarbons and water). Exemplary examples of hydrocarbon foaming agents include, without limitation, silicone foaming agents such as tetra(trimethylsiloxy)silane or polysiloxanes, fluorinated oligomeric or polymeric foaming agents such as fluorinated methacrylic copolymer or other fluorosurfactants, or other similar foaming agents capable of producing a foam in a hydrocarbon or oil-based drilling fluid or mixtures or combinations thereof. Exemplary examples of such foaming agents include, without limitation, DC-1250, DC-193, or other DC foamers available from Dow Corning, Zonyl FSG available from DuPont, Silwet (polyaklylene oxide modified dimethylpolysiloxanes) from Witco and Union Carbide, APFS-16 available from Applied Polymer, A4851 available from Baker Petrolite, Paratene HFA available from Woodrising, JBR200, JBR300, JBR400, and JBR500 available from Jeneil Biosurfactant Company, Paratene HFA, Paratene HFB, Paratene MFA, Paratene MFB available from Woodrising Resources Ltd. or mixture or combinations. Suitable water foaming agent include, without limitation, any water based foaming agent including those disclosed in U.S. patent application Ser. No. 10/745,290, filed Dec. 23, 2003 and Ser. No. 10/839,734, filed May 5, 2004 and any patent cited therein, incorporated herein by reference.

Suitable polymers for use in this invention include, without limitation, any polymer soluble in the hydrocarbon base fluid. Exemplary polymers include, without limitation, a polymer comprising units of one or more (one, two, three, four, five, . . . , as many as desired) polymerizable mono-olefins or di-olefins. Exemplary examples includes, without limitation, polyethylene, polypropylene, polybutylene, or other poly-alpha-olefins, polystyrene or othe polyaromatic olefins, polybutadiene, polyisoprene, or other poly-diolefins, or copolymers (a polymer including two or more mono-olefins or di-olefins) or copolymers including minor amount of other co-polymerizable monomers such as acrylates (acrylic acid, methyl acrylate, ethyl acrylate, etc.), methacrylates (methacrylic acid, methyl methacrylate, ethyl methacrylate, etc), vinylacetate, maleic anhydride, succinic anhydride, or the like, provided of course that the resulting polymer is soluble in the hydrocarbon base fluid.

Suitable gelling agents for use in this invention include, without limitation, any gelling agent. Exemplary gelling agents includes phosphate esters, ethylene-acrylic acid copolymer, ethylene-methacrylic acid copolymers, ethylene-vinyl acetate copolymers, ethylene-maleic anhydride copolymers, butadiene-methacrylic acid copolymers, ethylene-methacrylic acid copolymers, styrene-butadiene-acrylic acid copolymers, styrene-butadiene-methacrylic acid copolymers, or other copolymer including monomers having acid moieties or mixtures or combinations thereof. Exemplary examples phosphate ester gelling agents include, without limitation, WEC HGA 37, WEC HGA 70, WEC HGA 71, WEC HGA 72, WEC HGA 702 or mixtures or combinations thereof, available from Weatherford International iso-octyl, 2-ethylhexyl, phosphate esters or other phosphate esters from P-2, and similar phosphonate esters of high molecular weight alcohols available from Halliburton or mixtures or combinations thereof. Other suitable gelling agents include, without limitation, Geltone II available from Baroid, Ken-Gel available from Imco or the like.

Suitable cross-linking agent for use in this invention include, without limitation, any suitable cross-linking agent for use with the gelling agents. Exemplary cross-linking agents include, without limitation, di-, tri or tetra-valent metal salts such as calcium salts, magnesium salts, cerium salts, barium salts, copper (copprous and cupric) salts, cobalt salts, chromium salts, manganese salts, titanium salts, iron salts (ferrous and ferric), zinc salts, zirconium salts, aluminum salts, any other transition metal, actinide metal or lanthanide metal salt capable of acting as a phosphate ester cross-linking agent or mixtures or combinations thereof. Exemplary examples cross-linking agent for use with phosphate esters include, without limitation, WEC HGA 44, WEC HGA 48, WEC HGA 55se, WEC HGA 55s, WEC HGA 61, WEC HGA 65 or mixtures or combinations thereof available from Weatherford International.

Suitable defoaming agents for use in this invention include, without limitation, any defoaming agent capable of reducing the foam height of the foamed drilling fluid systems of this invention. Exemplary examples of defoaming agents are low molecular weight alcohols with isopropanol or isopropyl alcohol (IPA), methanol or mixtures of low molecular weight alcohols, cellosolves, esters or the like, low molecular weight paraffinic hydrocarbons or mixtures or combinations thereof.

Compositional Ranges

The gas lift compositions of this invention are defined on a volume percent (vol % or vol. %) basis based on 100 mL of a hydrocarbon base fluid. The gas retention composition is added to the hydrocarbon base fluid in an effective amount sufficient to achieve a desired lightening of the well fluids and is dependent on the amount and nature of the injected gas and on the well fluids.

Generally, the gas retention composition is added to the hydrocarbon based fluid in a volume percent (vol. %) ranging between about 0.01 vol. % and about 10.0 vol. %. In certain embodiments, the gas retention composition is added to the hydrocarbon base fluid in a volume percent (vol. %) ranging between about 0.05 vol. % and about 5.0 vol. %. In other embodiments, the gas retention composition is added to the hydrocarbon base fluid in a volume percent (vol. %) ranging between about 0.05 vol. % and about 2.5 vol. %. In other embodiments, the gas retention composition is added to the hydrocarbon base fluid in a volume percent (vol. %) ranging between about 0.10 vol. % and about 1.0 vol. %. In other embodiments, the gas retention composition is added to the hydrocarbon base fluid in a volume percent (vol. %) ranging between about 0.10 vol. % and about 10.0 vol. %. In other embodiments, the gas retention composition is added to the hydrocarbon base fluid in a volume percent (vol. %) ranging between about 0.10 vol. % and about 5.0 vol. %. In other embodiments, the gas retention composition is added to the hydrocarbon base fluid in a volume percent (vol. %) ranging between about 0.10 vol. % and about 2.5 vol. %. In other embodiments, the gas retention composition is added to the hydrocarbon base fluid in a volume percent (vol. %) ranging between about 0.10 vol. % and about 1.0 vol. %.

If used, the foaming agent is generally added to the hydrocarbon base fluid in a volume percent (vol. %) ranging between about 0.01 vol. % and about 10.0 vol. %. In certain embodiments, the foaming agent is added to the hydrocarbon base fluid in a volume percent (vol. %) ranging between about 0.05 vol. % and about 5.0 vol. %. In other embodiments, the foaming agent is added to the hydrocarbon base fluid in a volume percent (vol. %) ranging between about 0.05 vol. % and about 2.5 vol. %. In other embodiments, the foaming agent is added to the hydrocarbon base fluid in a volume percent (vol. %) ranging between about 0.10 vol. % and about 10.0 vol. %. In other embodiments, the foaming agent is added to the hydrocarbon base fluid in a volume percent (vol. %) ranging between about 0.10 vol. % and about 5.0 vol. %. In other embodiments, the foaming agent is added to the hydrocarbon base fluid in a volume percent (vol. %) ranging between about 0.10 vol. % and about 2.5 vol. %. In other embodiments, the foaming agent is added to the hydrocarbon base fluid in a volume percent (vol. %) ranging between about 0.10 vol. % and about 1.0 vol. %.

Generally, the polymer is added to the hydrocarbon based fluid in a volume percent (vol. %) ranging between about 0.01 and about 10.0 vol. %. In certain embodiments, the polymer is added to the hydrocarbon base fluid in a volume percent (vol. %) ranging between about 0.05 vol. % and about 5.0 vol. %. In certain embodiments, the polymer is added to the hydrocarbon base fluid in a volume percent (vol. %) ranging between about 0.05 vol. % and about 2.5 vol. %. In other embodiments, the polymer is added to the hydrocarbon base fluid in a volume percent (vol. %) ranging between about 0.10 vol. % and about 10.0 vol. %. In other embodiments, the polymer is added to the hydrocarbon base fluid in a volume percent (vol. %) ranging between about 0.1 vol. % and about 5.0 vol. %. In other embodiments, the polymer is added to the hydrocarbon base fluid in a volume percent (vol. %) ranging between about 0.10 vol. % and about 2.5 vol. %. In other embodiments, the polymer is added to the hydrocarbon base fluid in a volume percent (vol. %) ranging between about 0.10 vol. % and about 1.0 vol. %.

Generally, the gelling agent is added to the hydrocarbon based fluid in a volume percent (vol. %) ranging between about 0.01 and about 10.0 vol. %. In certain embodiments, the gelling agent is added to the hydrocarbon base fluid in a volume percent (vol. %) ranging between about 0.05 vol. % and about 5.0 vol. %. In other embodiments, the gelling agent is added to the hydrocarbon base fluid in a volume percent (vol. %) ranging between about 0.05 vol. % and about 2.5 vol. %. In other embodiments, the gelling agent is added to the hydrocarbon base fluid in a volume percent (vol. %) ranging between about 0.10 vol. % and about 10.0 vol. %. In other embodiments, the gelling agent is added to the hydrocarbon base fluid in a volume percent (vol. %) ranging between about 0.10 vol. % and about 5.0 vol. %. In other embodiments, the gelling agent is added to the hydrocarbon base fluid in a volume percent (vol. %) ranging between about 0.10 vol. % and about 2.5 vol. %. In other embodiments, the gelling agent is added to the hydrocarbon base fluid in a volume percent (vol. %) ranging between about 0.10 vol. % and about 1.0 vol. %.

Generally, the cross-linking agent is added to the hydrocarbon based fluid just before use in a volume percent (vol. %) ranging between about 0.005 and about 0.5 vol. %. In certain embodiments, the cross-linking agent is added to the hydrocarbon base fluid in a volume percent (vol. %) ranging between about 0.005 vol. % and about 0.25 vol. %. In other embodiments, the cross-linking agent is added to the hydrocarbon base fluid in a volume percent (vol. %) ranging between about 0.005 vol. % and about 0.2 vol. %. In other embodiments, the cross-linking agent is added to the hydrocarbon base fluid in a volume percent (vol. %) below about 0.2 vol. %. In other embodiments, the cross-linking agent can be added to the fluid along with the gelling agent prior to use, but adding the gelling agent and the cross-linking agent results in a viscosity increase that can render transportation more costly. Of course, the cross-linking agent can be added to the fluid in the absence to the gelling agent and the gelling agent added just prior to use.

When using a gas retention composition including a gelling agent and its cross-linking agent, the two components are generally not added to the fluid until the fluid is to be used to maintain the fluid in a low viscosity state until use. However, the fluid can be pre-made with one, but not both of the agents present. Of course, if viscosity is not an issue during transportation, both agents can be added together. For compositions including a foaming agent and the gelling agent and its cross-linking agent, the foaming agent can be added at any time, but generally the gelling agent and its cross-linking agent are not added together until use, with the same provisos as set forth above. For polymer viscosified fluids, the polymer can be added at any time depending on viscosity requirements during transportation or the user prerogative.

Generally, the amount of defoaming agent added to defoam the lightened well fluids is a vol. % amount sufficient to break the foam. In one embodiment, the defoaming vol. % ranges from about 0.05 vol. % to about 5 vol. %. In another embodiment, the defoaming vol. % ranges from about 0.1 vol. % to about 2.5 vol. %. In another embodiment, the defoaming vol. % ranges from about 0.1 vol. % to about 1.0 vol. %. In another embodiment, the defoaming vol. % ranges from about 0.25 vol. % to about 0.5 vol. %.

Composition Characteristics

Generally, the gas lift compositions of this invention are added to the well fluid in an amount (gas and gas retention composition) to lighten the well fluids to a desired density below a density of the well fluids in the absence of the gas lift composition. The amount of lift composition in the well fluids is sufficient to retain the gas in the well fluid to enhance well fluids production. The gas retention composition is designed to keep a sufficient amount of the gas retained in the well fluids for a period of time between about 2 minutes and 20 minutes depending on the application, the composition of the well fluids, the rate of production and the exact formulation of the gas lift compositions of this invention. The stability of retained, absorbed, entrained and/or solubilized gas in the modified well fluids is controlled by the amount and type of the viscosifying agents in the composition, by the amount and type of the foaming agents in the composition, if present, by the amount of gas and type of gas in the composition, by the temperature of the composition and by the pressure of the composition. Generally, increasing the amount of the viscosifying agents and/or foaming agents, the retained gas and duration of the retained gas can be increased. Generally, the viscosifying agents increase the stability and duration of the retained gas. Of course, the gas retention time is directly proportional to the amount and type of gas dissolved or absorbed in the fluid.

In certain embodiments, the modified well fluids (well fluids and gas lift composition) having increase gas retention properties capable of retaining sufficient gas to lighten the modified well fluids relative to the well fluids in the absence of the gas lift compositions of this invention for a period of time between about 2 minutes and about 20 minutes or more.

In other embodiments, the modified well fluids (well fluids and gas lift composition) having increase gas retention properties capable of retaining sufficient gas to lighten the modified well fluids relative to the well fluids in the absence of the gas lift compositions of this invention for a period of time between about 3 and about 20 minutes.

EXPERIMENTS OF THE INVENTION

Although the composition is not used directly as a foaming agent, the properties of the composition can be understood relative to its foaming properties.

Foam Test

Foam test used a Lab Hamilton Beach Malt Mixer. The mix procedure was to mix the test drilling fluids at high speed for 45 seconds to 60 seconds and noting any change at 15 second intervals. Foaming concentration tested are as set forth herein. After foaming on the mixer, the test drilling fluids were poured into either a 1,000 mL of 500 mL graduated cylinder to determine if the foam measurement were linear. The foam height represented the mL occupied by the foam after the foam was poured into the cylinder. The half life represents the time it takes a foam having an initial foam volume to decay by 50% of that original foam volume, e.g., if the initial foam volume is 500 mL as measured in a 1000 mL graduated cylinder, then the half life is the time is takes for the foam volume to reduce to a value of 250 mL.

EXAMPLE 1

This example illustrates the preparation of an illustrative example of a diluted cross-linking agent of this invention, which is then used in all of the subsequent formulations.

A cross-linking solution was prepared by adding 90 wt % of monoethylene glycol and 10 wt. % of WEC HGA-65, a ferric cross-linking agent, available from Weatherford International.

EXAMPLE 2

This example illustrates the preparation and testing of an illustrative example of foaming composition of this invention for foaming an oil-based drilling fluid including a foaming agent, a gelling agent and a cross-linking agent.

To 100 mL of "Off Road" Red Diesel #2 high sulfur content, 0.2 vol. % of HGA 70, a phosphate ester hydrocarbon gelling agent available form Weatherford International, and 0.5 vol. % of the solution of Example 1 were added. The resulting solution was mixed for 1 minute on Hamilton Beach Mixer at the highest speed. This solution was found to generate a foam having a foam height of 150 mL as measured in a graduated cylinder and a half life of 2:40 minutes.

To the above solution was added 0.5 vol. % of DC-1250, a foaming agent available from Dow Corning, and the resulting solution was mixed for 1 minute on Hamilton Beach Mixer at the highest speed. The solution was found to generate a foam having a foam height of 170 mL and a half life of 5:15 minutes.

To the solution was added 10 vol. % crude oil as a contaminant. The crude oil contaminated solution was mixed for 1 minute on Hamilton Beach Mixer at the highest speed. The crude oil contaminated solution was found to generate a foam having a foam height of 180 mL and a half life of 2:00 minutes.

To the crude oil contaminated solution was added 0.5 vol. % DC-1250. The solution was mixed for 1 minute on Hamilton Beach Mixer at the highest speed. The solution output was found to generate a foam having a foam height of 185 mL and a half life of 2:00 minutes.

Thus, crude oil contamination of the drilling fluid is detrimental to foam stability decreasing its half life from greater than 5 minutes to about 2 minutes.

EXAMPLE 3

This example illustrates the preparation and testing of another illustrative example of a foaming composition of this invention for foaming an oil-based drilling fluid.

To 100 mL "Off Road" Red Diesel #2, 0.2 vol. % HGA 70, a phosphate ester gelling agent available from Weatherford International, and 0.5 vol. % of the cross-linking solution of Example 1 were added. The solution was mixed for 1 minute on Hamilton Beach Mixer at the highest speed. To this solution was added 0.5 vol. % Zonyl FSG, a foaming agent available from DuPont with mixing for 1 minute on Hamilton Beach Mixer at the highest speed. The foamed solution had a foam height of 170 mL and a half life of 6:00 minutes.

To this solution was added 10 vol. % of crude oil as a contaminant with mixing for 1 minute on Hamilton Beach Mixer at the highest speed to produce a foam having a foam height of 180 mL with a half life of 2:00 minutes.

From Examples 2 and 3, the addition of crude oil to the drilling fluid decrease foam stability as measure by foam half life. Thus, when using oil based drilling fluids where the risk of crude oil contamination is high will require an increase in the relative concentration of the gelling agent and the cross-linking agent and possibly the foaming agent. In formulation terms, the foaming compositions of this invention for use in crude oil contaminated drilling fluid should be formulated with higher concentrations of the gelling agent and cross-linking agents. Generally, the vol % for this purpose should be in the range between about 0.5 vol % and about 5 vol. % gelling agent and between about 0.1 vol. % and about 0.5 vol. % cross-linking agent.

EXAMPLE 4

This example illustrates the preparation and testing of another illustrative example of a foaming composition of this invention for foaming an oil-based drilling fluid.

To 100 mL "Off Road" Red Diesel #2, 0.5 vol. % HGA 70, phosphate ester gelling agent available from Weatherford International, and 0.5 vol. % of the cross-linking solution of Example 1 were added with mixing for 1 minute on Hamilton Beach Mixer at the highest steep. To this solution was added 0.5 vol. % of DC-1250, a foaming agent available from Dow Corning with mixing for 1 minute on Hamilton Beach Mixer at the highest speed producing a foam having a foam height of 160 mL and a half life of 4:10 minutes.

To this foamable drilling fluid was added 10 vol. % of crude oil as a contamination with mixing for 1 minute on Hamilton Beach Mixer at the highest speed to form a foam having a foam height of 170 mL and half life of 2:00 minutes.

To this oil contaminated drilling fluid were added 0.5 vol. % HGA 70 phosphate ester and 0.5 vol. % of the cross-linking solution of Example 1 mixing for 1 minute on Hamilton Beach Mixer at the highest speed to produce a foam having a foam height of 160 mL and a half life of 3:00 minutes.

To this drilling fluid was added 10 vol. % of field brine (water) as another source of contamination mixing for 1 minute on Hamilton Beach Mixer at the highest speed to produce a foam having a foam height of 170 mL and a half life of 5:00 minutes.

Thus, the addition of additional gelling agent and cross-linking agent increases half life as does the addition of water with formation of only a weak emulsion.

EXAMPLE 5

The following examples illustration the aeration of 1500 mL of diesel #2 (red) were placed in a Hamilton Beach and mixed. 0.5% (v/v) of HGA 70 available from Clearwater International, Inc. and 0.5% (v/v) of the solution of Example 1 were added with mixing to the diesel. The resulting fluid, which is referred to as Diesel Gel, was mixed for 1 hour at medium speed. 250 mL of the resulting Diesel Gel were pour into 500 mL pressure cell. In those formulations that include a foamer, the indicated amount of DC-1250 foamer was added to the cell before pressurization, which results in a 250 mL air gap in the cell. The cell was pressurized to 300 psi with test gas. The cell is left under static conditions for 16 hours at ambient temperature. The cell was then depressurized and the aerated fluid was poured into 1000 mL graduate cylinder and the foam height (FH) and half life (HL) were measured. The results of the tests are tabulated in Table I.

TABLE I

Aerated Fluid Foam Data

| Test | System | Gas | FH | HL | Density |
|---|---|---|---|---|---|
| 1 | 250 mL Diesel Gel | MN† | 550 | 6:00 | 2.3 |
| 2 | 250 mL Diesel Gel + .25% DC1250 | MN | 480 | 13:30 | 3.0 |
| 3 | 250 mL Diesel + .25% DC1250 | MN | 580 | 3:03 | 2.1 |
| 4 | 250 mL Diesel Gel | $N_2$‡ | 520 | 4:00 | 2.6 |
| 5 | 250 mL Diesel Gel + .25% DC1250 | $N_2$ | 460 | 7:38 | 3.3 |
| 6 | 250 mL Diesel + .25% DC1250 | $N_2$ | 370 | 0:30 | 5.8 |
| 7* | 250 mL Diesel Gel | Air†† | 400 | 0:17 | 4.7 |
| 8 | 250 mL Diesel Gel + .25% DC1250 | Air | 550 | 12:16 | 2.3 |
| 9 | 250 mL Diesel + .25% DC1250 | Air | 650 | 3:45 | 1.8 |

*Gel at the bottom of the container - no viscosity
†MN is membrane nitrogen, which is 96% nitrogen with 4% residual oxygen
‡$N_2$ is 99.9999% nitrogen
††Air is compressed air The data clearly shows that the fluid including the gelling agent and its cross-linking agent is able to hold gas and spontaneously convert to a stable foam after a disruptive event.

EXAMPLE 6

This example illustrates the gasification of a fluid of this invention including a gelling agent and its cross-linking agent.

To 250 mL of "Off Road" Red Diesel #2 having a high sulfur content, 0.5 vol. % of HGA 70, a phosphate ester hydrocarbon gelling agent available from Weatherford International, and 0.5 vol. % of the solution of Example 1 were added. The resulting solution was then placed in a 500 mL pressure cell. The pressure cell was sealed and the cell was pressurized to 300 psi with membrane nitrogen (96% nitrogen, 4% oxygen) and left at that pressure for 15 minutes. The pressure in the cell was then relieved to produce a gasified fluid having substantially the same volume. The density of the fluid before and after pressurization is substantially the same as diesel, which is about 7 lbs/gal. A stirring rod was then placed in the fluid and the fluid was stirred by the rod one time in a clockwise fashion. The resulting disruptive event causes the fluid to transition to a foam in approximately 1 second. The foam expanded to the top of the 500 mL cell, essentially doubling its volume. Thus, the original 7 lbs/gal fluid, upon gentle agitation, was spontaneously converted (within approximately a second) to a 3.5 lbs/gal fluid foam. Prior to stirring, the fluid showed signs of a slow out-gassing of the dissolved or absorbed gas.

EXAMPLE 7

This example illustrates the preparation and ambient temperature recycle testing of another illustrative example of a foaming composition of this invention for foaming an oil-based drilling fluid.

First Foam/Defoam Cycle

To 100 mL of crude oil from the Comanche Resources Andrews field #23-1 Dewey County, OK were added 1 vol. % HGA 37, a gelling agent, 0.05 vol. % HGA65, a cross-linking agent, and 0.50 vol. % Zonyl FSG, a foaming agent, with mixing for 1 minute on Hamilton Beach Mixer at the highest speed to produce a foam having a foam height of 140 mL and a half life of 3:40 minutes.

To this foam was added 0.5 mL of IPA, a defoaming agent to break the foam.

Second Foam/Defoam Cycle

The broken foam from the first foam/defoam cycle was then mixed for 1 minute on Hamilton Beach Mixer at the highest speed to produce a foam having a foam height of 138 mL and half life of 4:00 minutes.

To this foam was added 0.5 mL IPA, a defoaming agent to break the foam.

Third Foam/Defoam Cycle

The broken foam from the second foam/defoam cycle was then mixed for 1 minute on Hamilton Beach Mixer at the highest speed to produce a foam having a foam height of 138 mL and a half life 6:00 minutes.

To this foam was added 0.5 mL IPA, a defoaming agent to break the foam.

Fourth Foam/Defoam Cycle

The broken foam from the third foam/defoam cycle was then mixed for 1 minute on Hamilton Beach Mixer at the highest speed to produce a foam having a foam height of 130 mL and a half life 8:00 minutes.

To this foam was added 0.5 mL IPA, a defoaming agent to break the foam.

Fifth Foam/Defoam Cycle

The broken foam from the fourth foam/defoam cycle was then mixed for 1 minute on Hamilton Beach Mixer at the highest speed to produce a foam having a foam height of 122 mL and a half life 8:40 minutes.

To this foam was added 0.5 mL IPA, a defoaming agent to break the foam.

Sixth Foam/Defoam Cycle

The broken foam from the fifth foam/defoam cycle was then mixed for 1 minute on Hamilton Beach Mixer at the highest speed to produce a foam having a foam height of 118 mL and a half life 9:00 minutes.

To this foam was added 0.5 mL IPA, a defoaming agent to break the foam.

Seventh Foam/Defoam Cycle

The broken foam from the sixth foam/defoam cycle was then mixed for 1 minute on Hamilton Beach Mixer at the highest speed to produce a foam having a foam height of 116 mL and a half life 10:00 minutes.

To this foam was added 0.5 mL IPA, a defoaming agent to break the foam.

Eighth Foam/Defoam Cycle

The broken foam from the seventh foam/defoam cycle was then mixed for 1 minute on Hamilton Beach Mixer at the highest speed to produce a foam having a foam height of 110 mL and a half life of 12:00 minutes.

Thus, the foaming compositions of this invention are capable of foaming a hydrocarbon drilling fluid system over many foam/defoam cycles without loss in foam stability. In fact, the foam appears to get more stable after each cycle, but is still capable of being broken by the addition of the defoaming agent.

EXAMPLE 8

This example illustrates the preparation and testing of an oil-based drilling fluid including a polymeric viscosifying agent in particular an SEPS Kraton Polymer (Styrene-Ethylene/Propylene-Styrene Block Copolymer) available from Kraton Polymer of Houston, Tex.

To 350 mL of Drillsolv Plus supplied by Enerchem (straight run distillate), 10 grams of the Kraton polymer were added with mixing using a Silverson Mixer running at 5000 RPM for 30 seconds to dissolve the polymer. 100 mL of polymer modified Drillsolv Plus were placed in a Hamilton Beach Mixer and mixed at high shear with for 1 minute. The resulting foam had a foam height of 150 mL and a half life of 2 minute and corresponded to a drilling fluid having 4.7 lb/gal fluid of the polymeric viscosifying agent.

EXAMPLE 9

This example illustrates the preparation and testing of an oil-based drilling fluid including a polymeric viscosifying agent in particular an SEPS Kraton Polymer (Styrene-Ethylene/Propylene-Styrene Block Copolymer) available from Kraton Polymer of Houston, Tex.

Based on the process of Example 6, a 3.0 lb/gal drilling fluid was prepared. 100 mL of 3.0 lb/gal drilling fluid were place in a pressurized aging cell. The cell was pressurized to 400 psi with compressed air for 5 minutes at ambient temperature. The cell was then depressurized to produce an aerated drilling fluid having very little foam, approximately 5-10 mL of foam on top of the liquid (5-10% v/v). The aerated drilling fluid was then poured into a 250 mL graduated cylinder, which disrupted the fluid producing a foam having a foam height of 230 mL and a half life of 4.5 minutes.

EXAMPLE 10

This examples illustrates the circulation of a diesel fluid of this invention containing a gelling agent and its cross-linking agent through a closed loop to demonstrate the pump ability of the fluid and its in situ gasification.

Circulation was initiated with a diesel #2 fluid. At zero time, recording was started and 0.5 vol. % of HGA-70, a gelling agent, was added to the diesel fluid. At t=0:22, 0.5 vol. % of the solution of Example 1 was added to the fluid over a 15 minute period. At t=0:47, air from a compressor (6 SCFM) was injected, but produced no bubbles and it was determined that a different air injection method was needed. At t=1:12, air from an air cylinder having a pressure of about 880 psi was used to overcome the circulation back pressure of about 830 psi. At t=1:17, the valve developed a leak and injection was discontinued to stop the leak. At t=1:33, air injection was re-established and bubbles were seen in the sight glass. At t=1:55, 0.5 vol. % of DC-1250, a hydrocarbon foamer, was added to the fluid. At t=2:06, a majority of fluid/foam was in flow over drum, and the loop was nearly empty. The test was stopped so that fluid could be pump back into the loop. At t=2:06-4:05, the fluid was continuously circulated, while heating to a temperature of 200° F. At t=4:05, air injection from the cylinder was started and a foam was observed in the sight glass. At t=4:07, a sample of the fluid was taken and had a density of 5.3 lb/gal. At t=4:13, air injection was turned off and another sample was taken that had a density of 4.2 lb/gal. At t=4:25, 0.5 vol % of HGA-70 and 0.5 vol. % of the solution of Example 1 were added to the fluid over an 18 minute period of time. At t=4:36, the fluid in flow was transferred over the drum back into loop. At t=4:51, another sample was taken that had a density of 5.2 lb/gal. At t=4:59, air injection from the cylinder was started at an injection pressure of 650 psi injection and a foam appeared in the sight glass. At t=5:01, another sample of the fluid was taken that had a density of 3.7 lb/gal. At t=5:13, another sample was taken that had a density of 3.8 lb/gal and a foam half life in the sight glass of greater than 17 minutes. At t=5:30, air injection was stated due to foam coming out of the flow over drum depleting the fluid in the loop. At t=5:31, 2.5 vol. % of of isopropanol, a defoamer, was added. At t=6:00, air injection was restarted. At t=6:04, another sample was taken that had a density of 5.8 lbm/gal. At t=6:16, hot fluid circulation was stopped ending the test. The results of the test are shown in FIG. 1. The data demonstrates that the fluid is pumpable and is capable of producing a light weight fluid when the fluid is withdrawn from the loop. Thus, unlike many foam systems that cause severe pump cavitation and locking, the fluids of this invention are capable of being gasified and pumped, while maintaining their ability to product light weight fluids after being withdrawn from a pressured environment.

EXAMPLE 11

This examples illustrates the foam characteristics of a gas lift composition of this invention is hydrocarbon fluids with methane gas as the foaming agent. This examples is designed to mimic gas lift operations using methane or natural gas as the lift gas.

The test data is tabulated in Table II. The tests were done by mixing the indicated ingredients in a vessel shaking the vessel ten times, inverting it and measuring foam height and foam half life.

TABLE II

Hydro Foam Test Method in 300psi Methane

| Test | | Foam Height | Half Life |
|---|---|---|---|
| 1 | 100 mL Crude Oil + 1 mL A foamer + 300 psi Methane | 510 | 18:40 |
| 2 | 100 mL Crude Oil + 1 mL B foamer + 300 psi Methane | 510 | 12:00 |
| 3 | 100 mL Condensate + 1 mL A foamer + 300 psi Methane | 0 | 0 |
| 4 | 100 mL Condensate + 1 mL B foamer + 300 psi Methane | 0 | 0 |
| 5 | 80 mL Crude Oil + 20 mL 3.5% SW + 1 mL A foamer + 300 psi Methane | 150 | 0 |
| 6 | 80 mL Crude Oil + 20 mL 3.5% SW + 1 mL B foamer + 300 psi Methane | 125 | 0 |
| 7 | 80 mL Condensate + 20 mL 3.5% SW + 1 mL A foamer + 300 psi Methane | 0 | 0 |
| 8 | 80 mL Condensate + 20 mL 3.5% SW + 1 mL B foamer + 300 psi Methane | 0 | 0 |

A foamer = 9.0 g 9312 HF + 1.0 g DC-1250 Old Version
B foamer = 9.0 g 9312 HF + 1.0 g DC-1250 New Version
Hydro Foam Test Method: 10 shakes inverted let stand 10 min.

The data shows clearly that a long lasting stable foam is obtained in crude oil with 1 mL of two different gas lift compositions of this invention referred to as A roamer and B roamer.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method for producing a well comprising the steps of:
    injecting an effective amount of a gas lift composition into well fluids in a producing oil and/or gas well or an oil and/or gas well being brought on production, where the effective amount is sufficient to reduce a density of the well fluids to a desired value below a value of the well fluids in the absence of the gas lift composition and increase well fluids production,
    where the gas lift composition comprises a lift gas and an retaining effective amount of a gas retention composition, where the gas retention composition comprises a hydrocarbon base fluid and viscosifying agent comprising a polymer, a cross-linkable composition including a gelling agent and a cross-linking agent or mixtures or combinations thereof.

2. The method of claim 1, further comprising:
    injecting the gas lift composition at one point or a plurality of points along a length of production tubing extending along a length of the wellbore.

3. The method of claim 1, further comprising the step of:
    injecting the gas retention composition at a bottom location in the wellbore and
    injecting the lift gas at one point or a plurality of points along a length of production tubing extending along a length of the wellbore.

4. The method of claim 2, wherein the retention composition further comprises a gasifying amount of a gasifying gas sufficient to gasify the retention composition, where the retention composition transitions from a liquid to a foam upon a change in pressure with or without a corresponding change in shear, and where the gasifying gas is the same or different from the gas lift gas.

5. The method of claim 4, further comprising the step of:
    pre-mixing the retention composition with a gasifying amount of a gasifying gas, where the retention composition transitions from a liquid to a foam upon a change in pressure with or without a corresponding change in shear, and where the gasifying gas and the gas lift gas are the same or different.

6. The method of claim 1, wherein the retention composition further comprises a foaming agent.

7. The method of claim 6, wherein the foaming agent is selected from the group consisting of silicone foaming agents, fluorinated foaming agents, or other hydrocarbon foaming agents and mixtures or combinations thereof.

8. The method of claim 1, wherein the gelling agent is selected from the group consisting of phosphate esters and mixtures or combinations thereof and its cross-linking agent is selected from the group consisting of di-, tri or tetra-valent metal salts such as calcium salts, magnesium salts, cerium salts, barium salts, copper salts, cobalt salts, chromium salts, manganese salts, titanium salts, iron salts, zinc salts, zirconium salts, aluminum salts, any other transition metal, actinide metal or lanthanide metal salt capable of acting as a phosphate ester cross-linking agent or mixtures or combinations thereof.

9. The method of claim 1, wherein the hydrocarbon base fluid is selected from the group consisting of synthetic hydrocarbon fluids, petroleum based hydrocarbon fluids, natural hydrocarbon (non-aqueous) fluids or other similar hydrocarbons or mixtures or combinations thereof.

10. The method of claim 1, wherein the hydrocarbon base fluid is selected from the group consisting of polyalphaolefins, polybutenes, polyolesters, biodiesels, simple low molecular weight fatty esters of vegetable or vegetable oil fractions, simple esters of alcohols, vegetable oils, animal oils or esters, other essential oil, diesel having a low or high sulfur content, kerosene, jet-fuel, white oils, mineral oils, mineral seal oils, hydrogenated oil, internal olefins (IO) having between about 12 and 20 carbon atoms, linear alpha olefins having between about 14 and 20 carbon atoms, polyalpha olefins having between about 12 and about 20 carbon atoms, isomerized alpha olefins (IAO) having between about 12 and about 20 carbon atoms, Naptha, Linpar, Parafins having between 13 and about 16 carbon atoms, and mixtures or combinations thereof.

11. The method of claim 1, wherein the polymer comprises units of one or more polymerizable mono-olefins or di-olefins, which is soluble in and increases the viscosity of the hydrocarbon base fluid.

12. The method of claim 1, wherein the reduced weight well fluids have a foam height of between about 150 mL and about 700 mL and a half life of between about 2 minutes and about 20 minutes based on 100 mL of the reduced weight well fluids.

13. The method of claim 1, wherein the lift gas is selected from the group consisting of air, nitrogen, membrane nitrogen, other nitrogen/oxygen gas mixtures, carbon dioxide, an inert gas, methane, ethane, propane, butane, natural gas, production gas, exhaust gas, flue gas and mixtures or combinations thereof.

14. The method of claim 13, wherein the inert gas is selected from the group consisting helium, neon, argon, xenon, krypton, or mixture or combinations thereof.

15. The method of claim 4, wherein the gasifying gas is selected from the group consisting of air, nitrogen, membrane nitrogen, other nitrogen/oxygen gas mixtures, carbon dioxide, an inert gas, methane, ethane, propane, butane, natural gas, production gas, exhaust gas, flue gas and mixtures or combinations thereof.

16. The method of claim 15, wherein the inert gas is selected from the group consisting of helium, neon, argon, xenon, krypton, or mixture or combinations thereof.

17. A method comprising the steps of:
pre-mixing a retention composition with a gasifying amount of a gasifying gas to form a gasified retention composition, where the gas retention composition comprises a hydrocarbon base fluid and viscosifying agent comprising a polymer, or a cross-linkable composition including a gelling agent and a cross-linking agent or mixtures or combinations thereof and where the gasified gas retention composition transitions from a liquid to a foam upon a change in pressure with or without a corresponding change in shear, and
injecting an effective amount of a gas lift composition into well fluids in a producing oil and/or gas well or an oil and/or gas well being brought on production, where the effective amount is sufficient to reduce a density of the well fluids to a desired value below a value of the well fluids in the absence of the gas lift composition and increase well fluids production, where the gas lift composition includes a lift gas and the gasified retention composition, and where the gasifying gas and the lift gas are the same or different.

18. The method of claim 17, further comprising:
injecting the gas lift composition at one point or a plurality of points along a length of production tubing extending along a length of the wellbore.

19. The method of claim 17, further comprising the step of:
injecting the gas retention composition at a bottom location in the wellbore and
injecting the lift gas at one point or a plurality of points along a length of production tubing extending along a length of the wellbore.

20. The method of claim 17, wherein the retention composition further comprises a foaming agent.

21. The method of claim 20, wherein the foaming agent is selected from the group consisting of silicone foaming agents, fluorinated foaming agents, or other hydrocarbon foaming agents and mixtures or combinations thereof.

22. The method of claim 17, wherein the gelling agent is selected from the group consisting of phosphate esters and mixtures or combinations thereof and its cross-linking agent is selected from the group consisting of di-, tri or tetra-valent metal salts such as calcium salts, magnesium salts, cerium salts, barium salts, copper salts, cobalt salts, chromium salts, manganese salts, titanium salts, iron salts, zinc salts, zirconium salts, aluminum salts, any other transition metal, actinide metal or lanthanide metal salt capable of acting as a phosphate ester cross-linking agent or mixtures or combinations thereof.

23. The method of claim 17, wherein the hydrocarbon base fluid is selected from the group consisting of synthetic hydrocarbon fluids, petroleum based hydrocarbon fluids, natural hydrocarbon (non-aqueous) fluids or other similar hydrocarbons or mixtures or combinations thereof.

24. The method of claim 17, wherein the hydrocarbon base fluid is selected from the group consisting of polyalphaolefins, polybutenes, polyolesters, biodiesels, simple low molecular weight fatty esters of vegetable or vegetable oil fractions, simple esters of alcohols, vegetable oils, animal oils or esters, other essential oil, diesel having a low or high sulfur content, kerosene, jet-fuel, white oils, mineral oils, mineral seal oils, hydrogenated oil, internal olefin (IO) having between about 12 and 20 carbon atoms, linear alpha olefins having between about 14 and 20 carbon atoms, polyalpha olefins having between about 12 and about 20 carbon atoms, isomerized alpha olefins (IAO) having between about 12 and about 20 carbon atoms, Naptha, Linpar, Parafins having between 13 and about 16 carbon atoms, and mixtures or combinations thereof.

25. The method of claim 17, wherein the polymer comprises units of one or more polymerizable mono-olefins or di-olefins, which is soluble in and increases the viscosity of the hydrocarbon base fluid.

26. The method of claim 17, wherein the reduced weight well fluids have a foam height of between about 150 mL and about 700mL and a half life of between about 2 minutes and about 20 minutes based on 100 mL of the reduced weight well fluids.

27. The method of claim 17, wherein the lift gas or gasifying gas is selected from the group consisting of air, nitrogen, membrane nitrogen, other nitrogen/oxygen gas mixtures, carbon dioxide, an inert gas, methane, ethane, propane, butane, natural gas, production gas, exhaust gas, flue gas and mixtures or combinations thereof.

28. The method of claim 27, wherein the inert gas is selected from the group consisting of helium, neon, argon, xenon, krypton, or mixture or combinations thereof.

* * * * *